(12) United States Patent  
Faller

(10) Patent No.: US 8,917,797 B2  
(45) Date of Patent: Dec. 23, 2014

(54) METHOD AND APPARATUS FOR CONTROLLING BUFFER OVERFLOW IN A COMMUNICATION SYSTEM

(75) Inventor: Christof Faller, Murray Hill, NJ (US)

(73) Assignee: LSI Corporation, Milpitas, CA (US)

( * ) Notice: Subject to any disclaimer, the term of this patent is extended or adjusted under 35 U.S.C. 154(b) by 1066 days.

(21) Appl. No.: 12/171,004

(22) Filed: Jul. 10, 2008

(65) Prior Publication Data

US 2008/0267333 A1   Oct. 30, 2008

Related U.S. Application Data

(62) Division of application No. 09/895,927, filed on Jun. 29, 2001, now Pat. No. 7,412,004.

(51) Int. Cl.
| | |
|---|---|
| *H03K 9/00* | (2006.01) |
| *H04L 23/00* | (2006.01) |
| *H04H 60/27* | (2008.01) |
| *H04H 60/11* | (2008.01) |
| *H04B 14/04* | (2006.01) |

(52) U.S. Cl.
CPC ............... *H04H 60/27* (2013.01); *H04H 60/11* (2013.01); *H04B 14/04* (2013.01); *H04H 2201/20* (2013.01)
USPC .......................................... 375/316; 375/377

(58) Field of Classification Search
USPC .......... 375/243, 246, 240.05, 240.26, 240.28, 375/372, 240.12, 242, 316, 340, 377; 348/419.1, 497
See application file for complete search history.

(56) References Cited

U.S. PATENT DOCUMENTS

| | | | | |
|---|---|---|---|---|
| 5,068,726 | A | * | 11/1991 | Kondo et al. ............ 375/240.14 |
| 5,159,447 | A | | 10/1992 | Haskell et al. ........... 375/240.05 |
| 5,164,828 | A | | 11/1992 | Tahara et al. ............ 375/240.13 |
| 5,543,853 | A | | 8/1996 | Haskell et al. ........... 375/240.28 |
| 5,552,832 | A | | 9/1996 | Astle ........................ 375/240.24 |
| 5,619,341 | A | | 4/1997 | Auyeung et al. .............. 358/404 |
| 5,844,867 | A | | 12/1998 | De Haan et al. ........... 369/47.35 |
| 5,917,835 | A | * | 6/1999 | Barrett et al. ................ 714/755 |
| 5,966,178 | A | * | 10/1999 | Tashima et al. .......... 375/240.18 |
| 6,031,584 | A | * | 2/2000 | Gray ........................ 375/240.28 |
| 6,034,731 | A | * | 3/2000 | Hurst, Jr. .................. 375/240.26 |
| 6,061,399 | A | | 5/2000 | Lyons et al. ................... 375/240 |
| 6,173,024 | B1 | | 1/2001 | Nanba et al. .................. 375/372 |
| 6,189,035 | B1 | | 2/2001 | Lockhart et al. .............. 709/229 |
| 6,192,079 | B1 | * | 2/2001 | Sharma et al. ........... 375/240.16 |
| 6,330,286 | B1 | | 12/2001 | Lyons et al. ............. 375/240.28 |
| 6,356,309 | B1 | | 3/2002 | Masaki et al. ............. 348/439.1 |
| 6,600,835 | B1 | * | 7/2003 | Ishikawa ....................... 382/236 |
| 6,674,797 | B1 | | 1/2004 | Golin ........................ 375/240.01 |
| 6,751,405 | B1 | * | 6/2004 | Hasegawa ...................... 386/111 |
| 6,813,275 | B1 | | 11/2004 | Sharma et al. ................ 370/412 |

(Continued)

*Primary Examiner* — Tesfaldet Bocure
(74) *Attorney, Agent, or Firm* — Daniel J. Santos; Smith Risley Tempel Santos LLC

(57) ABSTRACT

A method and apparatus are disclosed for controlling a buffer in a digital audio broadcasting (DAB) communication system. An audio encoder marks a frame as "dropped" whenever a buffer overflow might occur. Only a small number of bits are utilized to process a lost frame, thereby preventing the buffer from overflowing and allowing the encoder buffer-level to quickly recover from the potential overflow condition. The audio encoder optionally sets a flag that provides an indication to the receivers that a frame has been lost. If a "frame lost" condition is detected by a receiver, the receiver can optionally employ mitigation techniques to reduce the impact of the lost frame(s).

11 Claims, 3 Drawing Sheets

(56) References Cited

U.S. PATENT DOCUMENTS 8,175,867 B2 * 5/2012 Ikegami et al. ............... 704/212
2004/0131267 A1 * 7/2004 Adiletta et al. ............... 382/236
2005/0010850 A1 * 1/2005 Driessen et al. ............... 714/758
2005/0021809 A1 * 1/2005 Zhu et al. ...................... 709/231

* cited by examiner

A, B, C, D = LOST FRAMES

METHOD AND APPARATUS FOR CONTROLLING BUFFER OVERFLOW IN A COMMUNICATION SYSTEM

CROSS-REFERENCE TO RELATED APPLICATIONS

This application is a divisional of U.S. patent application Ser. No. 09/895,927, filed Jun. 29, 2001, incorporated by reference herein.

FIELD OF THE INVENTION

The present invention relates generally to digital audio broadcasting (DAB) and other types of digital communication systems, and more particularly, to buffer control techniques for such digital audio broadcasting (DAB) and other types of digital communication systems.

BACKGROUND OF THE INVENTION

Proposed systems for providing digital audio broadcasting (DAB) in the FM radio band are expected to provide near compact disk (CD)-quality audio, data services and more robust coverage than existing analog FM transmissions. Digital audio broadcasting systems compress an audio signal using a digital audio encoder, such as a perceptual audio coder (PAC). Perceptual audio coders reduce the amount of information needed to represent an audio signal by exploiting human perception and minimizing the perceived distortion for a given bit rate. Perceptual audio coders are described, for example, in D. Sinha et al., "The Perceptual Audio Coder," Digital Audio, Section 42, 42-1 to 42-18, (CRC Press, 1998), incorporated by reference herein Digital radio will be offered in a single channel and multiple channel form. The single channel form will use the existing infrastructure of FM broadcasting. Each digital audio channel is broadcast in the bandwidth allocated to one FM channel. Until such time as a transition to an all-digital DAB system can be achieved, many broadcasters require an intermediate solution in which the analog and digital signals can be transmitted simultaneously within the same licensed band. Such systems are typically referred to as hybrid in-band on-channel (HIBOC) DAB systems, and are being developed for both the FM and AM radio bands.

FIG. 1 illustrates a conventional DAB communication system 100. As shown in FIG. 1, the DAB communication system 100 employs a radio transmission link 130 that is typically of a fixed bit rate. The bit rate of the audio encoder 110 on the other hand is typically variable, depending on the complexity of the current audio signal and the audio quality requirements. On average, the bit rate of the audio encoder 110 is equal to or less than the capacity of the transmission link 130, but at any given instance the bit rate of the audio coder 110 may be higher. If data from the audio encoder 110 was applied directly to the transmission link 130, data would be lost each time the instantaneous bit rate of the encoder 110 exceeded the capacity of the transmission link 130. In order to prevent such a loss of data, the output of the encoder 110 is buffered into a first-in-first-out (FIFO) buffer 120 before being applied to the transmission link 130. If the instantaneous bit rate of the encoder 110 is higher than the bit rate of the transmission link, the amount of data in the FIFO buffer 120 increases. Similarly, if the instantaneous bit rate of the encoder 110 is lower than the bit rate of the transmission link 130, the amount of data in the FIFO buffer 120 decreases. The encoder 110 (or encoder bank) typically contains a control loop that modifies the bit rate of the encoder 110 and prevents the encoder 110 from overflowing or underflowing the FIFO buffer 120. Overflow causes a loss of bits, while an underflow wastes some of the capacity the transmission link 130.

As a result of this scheme, the transmission delay is also variable. The delay between the time when an audio packet is first written into the FIFO buffer 120 and the time when the packet is actually received by the receiver 150 depends, among other factors, on the amount of data that is currently stored in the FIFO buffer 120. However, the audio decoder 170 at the receiver 150 needs to get audio packets at a fixed rate (of packets per second) in order to play continuously. Therefore, it is necessary to buffer the audio data at the decoder 170 as well as using a buffer 160. When the receiver 150 is first powered up or is tuned to a new channel, the decoder 170 begins to play only after a certain initialization period, during which time packets are received and stored in the decoder-input buffer 160. After the decoder 170 begins playing, the decoder 170 consumes packets from the input buffer 160 at a fixed rate, while at the same time new packets arrive and are stored in the same buffer 160. The decoder input-buffer 160 has to have enough capacity so that even in the worst case of minimal delay and largest packet size, the buffer 160 will not overflow. In addition, the initialization period has to be sufficiently long to accumulate enough packets in the buffer 160 so that the buffer does not become empty due to transmission delays.

If the number of data bits in the encoder buffer 120 gets higher than the size of the decoder buffer 160, an overflow condition occurs since the frame at which this condition occurs will not arrive in time at the decoder 170 to be decoded. It is difficult to design a perceptually good bit-allocation scheme for an audio encoder 110 that guarantees that the number of data bits in the encoder buffer 120 stays within a specified range. Typically, high bursts of quantization noise are added to prevent the danger of buffer overflow. The perceptual effect of this is referred to as bit-starvation and frequently leads to a severely distorted audio signal. Nonetheless, if there is a danger that the buffer will overflow, then the audio encoder 110 typically introduces high noise bursts into the audio signal in order to use less bits for encoding. In the extreme case where a buffer overflow cannot be prevented, bits are wasted for a frame that is known to not arrive in time at the decoder.

A need therefore exists for an improved buffer control technique that does not waste bits when it is known that a frame will not arrive in time to be processed by the decoder. A further need exists for an improved buffer control technique that allows a decoder to employ mitigation techniques to minimize the impact of one or more dropped frames.

SUMMARY OF THE INVENTION

Generally, a method and apparatus are disclosed for controlling a buffer in a digital audio broadcasting (DAB) communication system. According to one aspect of the invention, an audio encoder marks a frame as "dropped" whenever a buffer overflow might occur indicating that the frame has not been transmitted. Thus, only a small number of bits are utilized to process a dropped frame, thereby preventing the buffer from overflowing. The present invention allows the encoder buffer-level to quickly recover from the potential overflow condition since only a small number of bits are placed in the encoder buffer. In this manner, the danger of further buffer overflows within a short period of time is greatly reduced.

The audio encoder optionally sets a flag that provides an indication to the receivers that a frame has been dropped (i.e., not transmitted). If a "frame dropped" flag is detected by a receiver, the receiver can optionally employ mitigation techniques to reduce the impact of the dropped frame(s). Thus, the present invention overcomes the problems of conventional buffer control techniques. If an overflow condition is likely to occur, the encoder can mark a frame as dropped when the high noise bursts it would otherwise need to introduce are perceptually more annoying than the effect of mitigation in the decoder. In addition, when a buffer overflow cannot be prevented, additional bits are not wasted for a frame that will not arrive in time at the decoder.

A more complete understanding of the present invention, as well as further features and advantages of the present invention, will be obtained by reference to the following detailed description and drawings.

DETAILED DESCRIPTION

Figure 1:
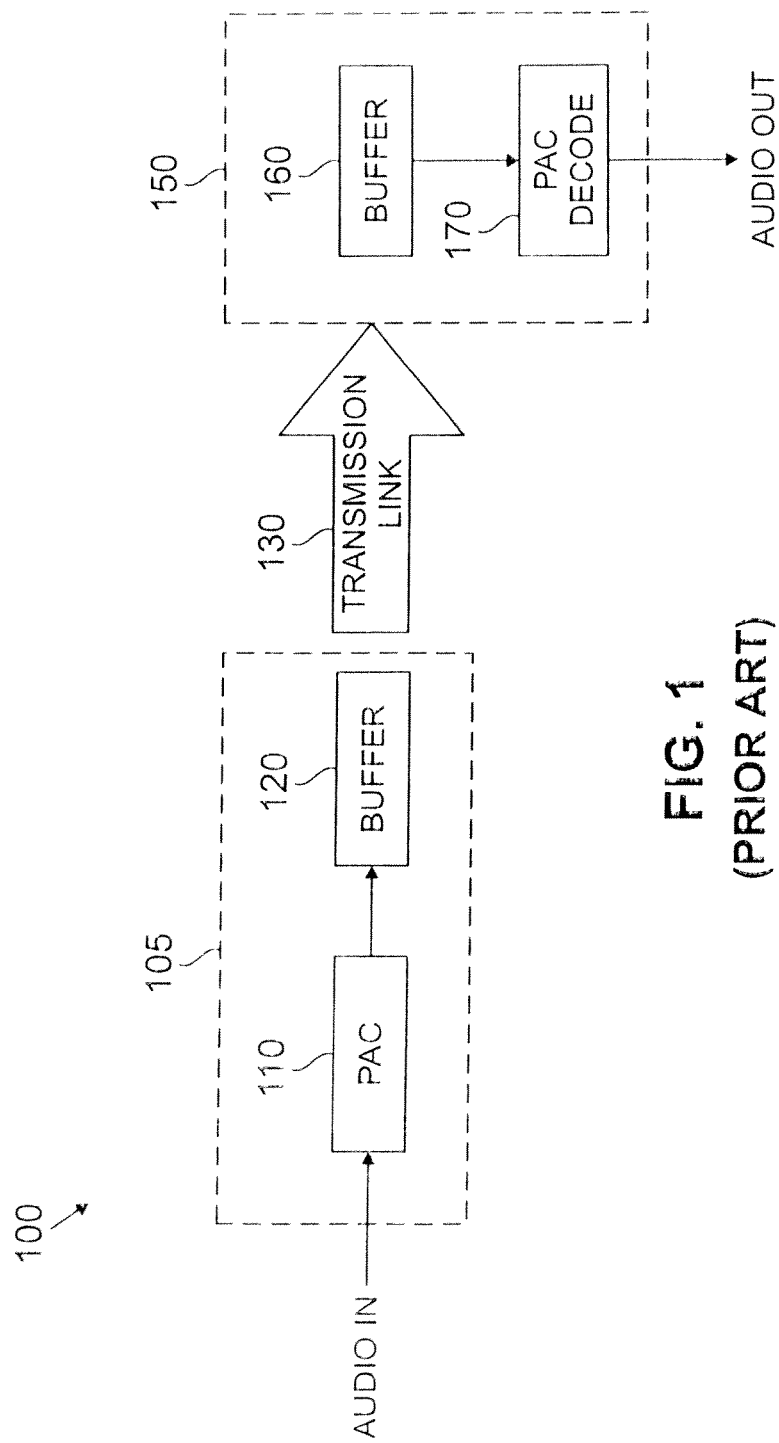
FIG. 1 illustrates a conventional DAB communication system.
Figure 2:
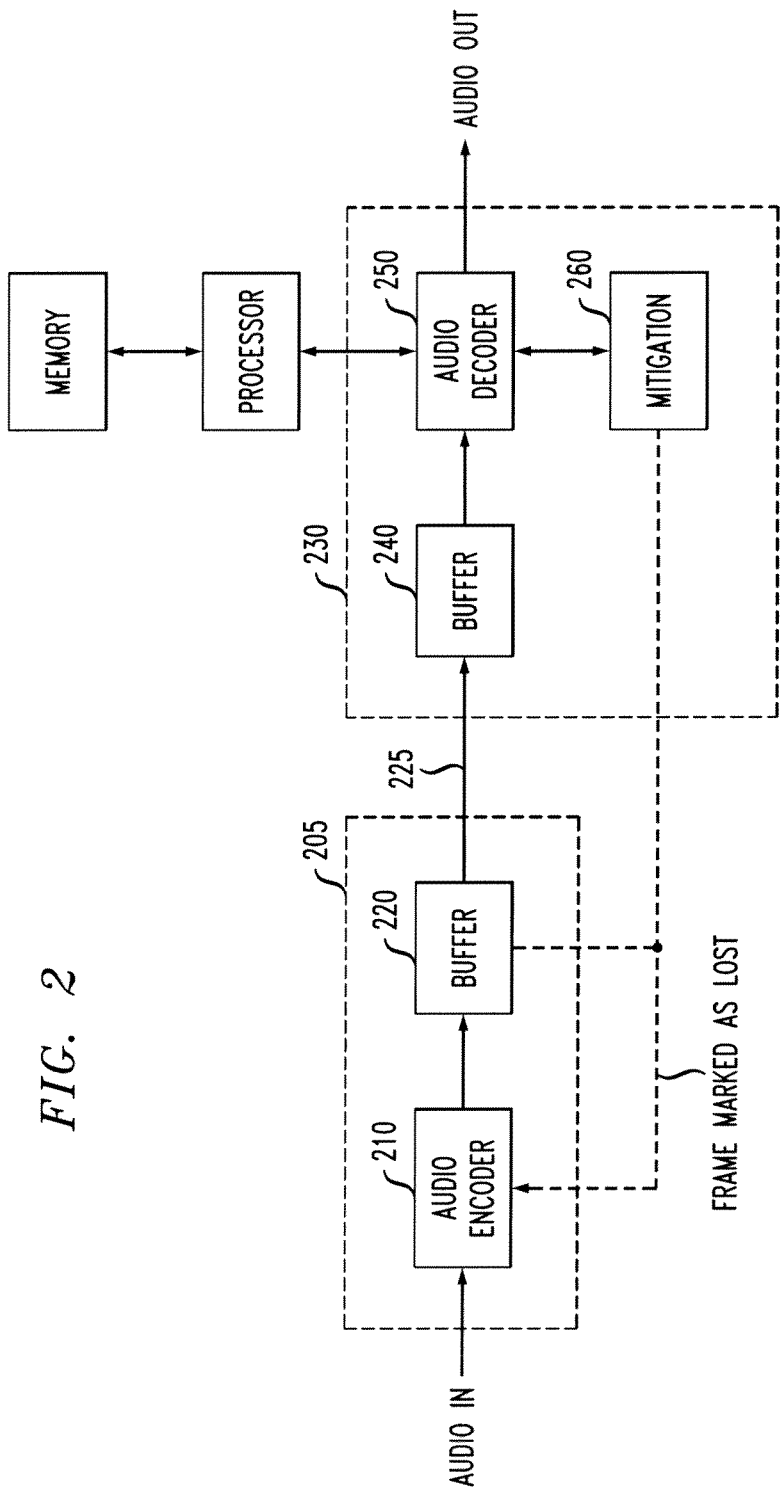
FIG. 2 illustrates a multiple channel DAB communication system in accordance with the present invention.

FIG. 2 illustrates a multiple channel DAB communication system 200 in accordance with the present invention. As shown in FIG. 2, the DAB communication system 200 includes a transmitter 205 having an audio encoder 210 and a buffer 220 and a receiver 230 having a buffer 240 and an audio decoder 250. A control loop (not shown) modifies the bit rate of the encoder 210 and prevents the encoder 210 from overflowing or underflowing the decoder buffer 240.

According to one aspect of the present invention, the audio encoder 210 marks a frame as "dropped" whenever an overflow of the encoder buffer 220 might occur (which corresponds to an underflow of the decoder buffer 240, due to the symmetric relationship between the encoder 210 and decoder 250). Thus, the audio encoder 210 places only a small number of bits into the buffer for the lost frame, thereby preventing a buffer overflow. In this manner, the level of the encoder buffer 220 immediately recovers from the dangerous situation because only a small number of bits are placed in the buffer 220 for processing. Thus, the danger of a second buffer overflow within a short period of time is greatly reduced. In one implementation, the audio encoder 210 sets a flag that indicates to the receiver 230 that a frame has been dropped.

The flag provides an indication to the receiver 230 that mitigation techniques should be employed, if desired, by a mitigation unit 260 to reduce the impact of the dropped frame(s). Although an exemplary mitigation technique is described hereinafter in a section entitled Error Mitigation, any known mitigation technique can be employed by the receiver 230 consistent with the present invention, as would be apparent to a person of ordinary skill in the art. In the exemplary embodiment, when a frame is marked as dropped, the mitigation unit 260 generates artificial data for the dropped frame, such that no severe artifacts are introduced into the audio signal.

The present invention overcomes the problems of conventional buffer control techniques. If the number of data bits in the encoder buffer 220 is close to an overflow, the encoder 210 can mark a frame as dropped when the high noise bursts it would otherwise need to introduce to prevent overflow are perceptually more annoying than the effect of mitigation in the decoder 250. In addition, when a buffer overflow cannot be prevented, bits are not wasted for a frame that will not arrive in time at the decoder (only a flag is sent to the decoder 250 to indicate that the frame has been dropped).

Error Mitigation

The receiver 230 can implement one or more error mitigation mechanisms when (i) an encoded frame is actually lost, e.g., due to transmission channel errors, in a known manner, or (ii) a frame is marked as dropped in accordance with the present invention. FIGS. 3A through 3D illustrate four examples of five successive frames generated by an audio coder, such as a PAC coder or an MPEG-2 AAC coder. Either one long transform window is used to encode one audio frame or eight short transform windows are used for encoding one frame. The long windows are used for encoding more or less stationary parts of an audio signal and the short windows are used to encode transient portions of an audio signal.

Figure 3A:
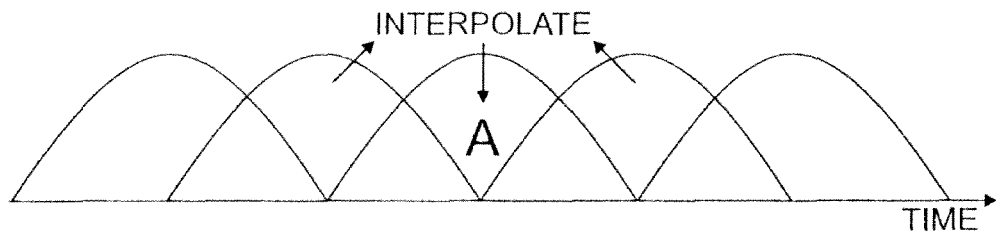
FIG. 3A through 3D illustrate various mitigation techniques that may be employed in accordance with the present invention.

In FIG. 3A, a frame with a long window is marked as dropped. In this case, the dropped frame and its adjacent frames represent a more or less stationary signal and good results can be achieved by substituting the dropped frame with a frame obtained by interpolating the spectral content of the adjacent frames.

Figure 3B:
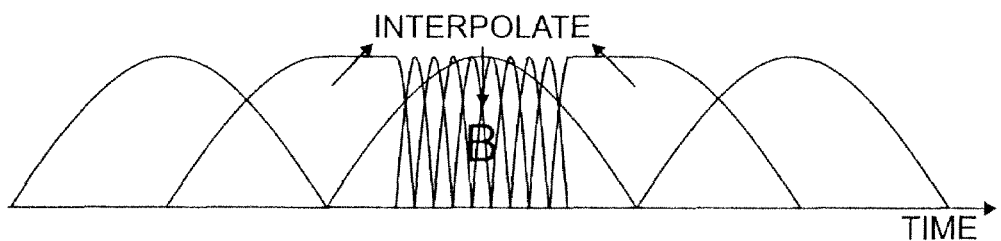

In FIG. 3B, a frame with short windows is marked as dropped. The dropped frame contained a transient but its adjacent frames are more or less stationary. Therefore, good results can be achieved by substituting the dropped frame with a long window frame obtained by interpolating the spectral content of the adjacent frames.

Figure 3C:
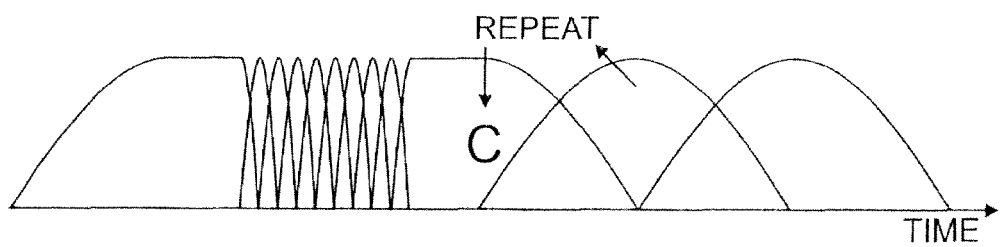

In FIG. 3C, a frame with a long window is marked as dropped. The dropped frame is preceded by a transient. Repeating the transient of the preceding frame would echo the transient and likely be perceived as an artifact. Therefore, the following frame is repeated.

Figure 3D:
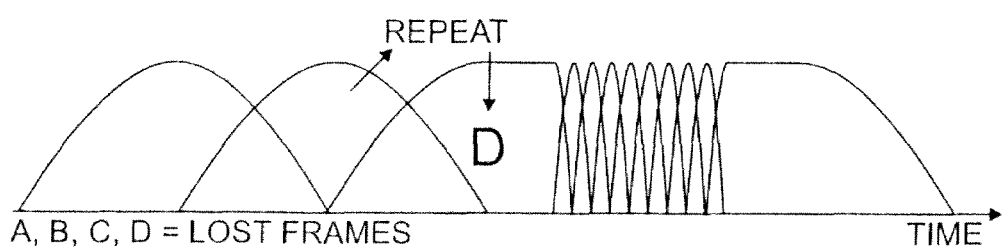

In FIG. 3D, a frame with a long window is marked as dropped. The dropped frame is followed by a transient. Repeating the transient of the following frame would echo the transient and likely be perceived as an artifact. Therefore, the previous frame is repeated.

A system for processing data in a communication system may comprise a memory that stores computer-readable code; and a processor operatively coupled to the memory, the processor configured to implement the computer-readable code, wherein the computer-readable code is configured to implement steps of the methods disclosed herein.

It is to be understood that the embodiments and variations shown and described herein are merely illustrative of the principles of this invention and that various modifications may be implemented by those skilled in the art without departing from the scope and spirit of the invention.

I claim:

1. A method for processing data in a communication system, said method comprising the steps of:
   receiving, in a decoder, a flag from a transmitter indicating a dropped frame;
   processing said indication of a dropped frame; and
   employing a decoder mitigation technique to compensate for said dropped frame based on said indication.

2. The method of claim 1, wherein said communication system is a digital audio broadcasting (DAB) system.

3. The method of claim 1, wherein said frames are audio data.

4. The method of claim 1, wherein said frames are video data.

5. The method of claim 1, wherein said frames are multimedia data.

6. A system for processing data in a communication system, comprising:
   a memory that stores computer-readable code; and
   a processor operatively coupled to said memory, said processor configured to implement said computer-readable code, said computer-readable code configured to:
   receive, in a decoder, a flag from a transmitter indicating a dropped frame;
   process said indication of a dropped frame; and
   compensate for said dropped frame in said decoder based on said indication.

7. The system of claim 6, wherein said communication system is a digital audio broadcasting (DAB) system.

8. The system of claim 6, wherein said frames are one or more of audio data, video data and multimedia data.

9. A system for processing data in a communication system, comprising:
   means for receiving, in a decoder, a flag from a transmitter indicating a dropped frame in said decoder;
   means for processing said indication of a dropped frame; and
   means for compensating for said dropped frame in said decoder based on said indication.

10. The system of claim 9, wherein said communication system is a digital audio broadcasting (DAB) system.

11. The system of claim 9, wherein said frames are one or more of audio data, video data and multimedia data.

* * * * *